(12) United States Patent
Reikher et al.

(10) Patent No.: US 10,286,448 B2
(45) Date of Patent: May 14, 2019

(54) HIGH-PERFORMANCE TOOL COOLING SYSTEM

(71) Applicant: Shiloh Industries, Inc., Valley City, OH (US)

(72) Inventors: Alexandre Reikher, Fox Point, WI (US); Clifford Jason Hoschouer, Medina, OH (US)

(73) Assignee: SHILOH INDUSTRIES, INC., Valley City, OH (US)

( * ) Notice: Subject to any disclaimer, the term of this patent is extended or adjusted under 35 U.S.C. 154(b) by 0 days.

(21) Appl. No.: 16/023,254

(22) Filed: Jun. 29, 2018

(65) Prior Publication Data

US 2018/0311724 A1 Nov. 1, 2018

Related U.S. Application Data

(62) Division of application No. 14/641,194, filed on Mar. 6, 2015.

(Continued)

(51) Int. Cl.
*B22D 17/22* (2006.01)
*B29C 51/42* (2006.01)
(Continued)

(52) U.S. Cl.
CPC ......... *B22D 17/2218* (2013.01); *B21D 37/16* (2013.01); *B22C 9/065* (2013.01);
(Continued)

(58) Field of Classification Search
CPC .... B22D 17/2218; B22D 17/22; B22D 30/00; B22C 9/065
See application file for complete search history.

(56) References Cited

U.S. PATENT DOCUMENTS

| 3,667,248 A | * | 6/1972 | Carlson | .............. | B22D 17/2218 |
| | | | | | 164/128 |
| 4,284,540 A | | 8/1981 | Iida | | |

(Continued)

FOREIGN PATENT DOCUMENTS

| DE | 2646060 A1 | 4/1978 |
| JP | 61108462 A | 5/1986 |

(Continued)

OTHER PUBLICATIONS

Chinese Office Action for Application No. 201580012197.3, 8 pages; dated Aug. 15, 2017.

(Continued)

*Primary Examiner* — Kevin P Kerns
*Assistant Examiner* — Steven S Ha
(74) *Attorney, Agent, or Firm* — Reising Ethington, P.C.

(57) ABSTRACT

A shaping tool includes a cooling system having one or more cooling passages configured for enhanced cooling. The cooling passages provide latent heat cooling of a heated material that is in contact with a shaping surface of the tool. Cooling fluid flows along the cooling passages in a two-phase flow regime in which a portion of the cooling fluid is liquid and a portion of the cooling fluid is vapor. A two-phase portion of the cooling passage can be shaped to follow a three-dimensional contour of the shaping surface. Opposing walls of the cooling passage can be provided by passage surfaces of separately formed pieces of the tool. The latent heat cooling provided by suitably configured cooling channels extracts more heat from the material being shaped in the tool than traditional cooling systems.

21 Claims, 7 Drawing Sheets

Related U.S. Application Data (60) Provisional application No. 61/949,480, filed on Mar. 7, 2014.

(51) Int. Cl.
  B21D 37/16 (2006.01)
  B29C 45/73 (2006.01)
  B22C 9/06 (2006.01)
  B21D 22/02 (2006.01)

(52) U.S. Cl.
  CPC ........ B29C 45/7337 (2013.01); B29C 51/428 (2013.01); *B21D 22/022* (2013.01); *B29C 2045/7362* (2013.01)

(56) References Cited

U.S. PATENT DOCUMENTS

| | | | |
|---|---|---|---|
| 4,667,729 | A | 5/1987 | Zeman |
| 6,435,258 | B1 | 8/2002 | Ogasawara et al. |
| 6,562,153 | B1 | 5/2003 | Uehara |
| 8,561,673 | B2 | 10/2013 | Schuette |
| 2001/0028930 | A1 | 10/2001 | Koch |
| 2002/0028265 | A1 | 3/2002 | Oueslati |
| 2010/0255138 | A1 | 10/2010 | Deckers |
| 2012/0137498 | A1* | 6/2012 | Lenze ................ C21D 1/18 29/460 |

FOREIGN PATENT DOCUMENTS

| | | |
|---|---|---|
| JP | 62130761 A | 6/1987 |
| JP | 62130762 A | 6/1987 |
| JP | 2012-110953 A | 8/2012 |

OTHER PUBLICATIONS

English Translation of Chinese Office Action for Application No. 201580012197.3, 10 pages.
International Search Report and Written Opinion dated May 29, 2015, 12 pages.
German Office Action for Application No. 11 2015 001 138.2, 4 pages; dated Feb. 20, 2018.
Japanese Office Action for Application No. 2016-573717, 4 pages; dated Feb. 6, 2018.
English Translation of Japanese Office Action for Application No. 2016-573717, 3 pages.

* cited by examiner

HIGH-PERFORMANCE TOOL COOLING SYSTEM

REFERENCE TO RELATED APPLICATIONS

This application is a divisional application of U.S. patent application Ser. No. 14/641,194 filed on Mar. 6, 2015, the entire contents of which are incorporated herein by reference. This application also claims the benefit of U.S. Provisional Ser. No. 61/949,480 filed on Mar. 7, 2014, the entire contents of which are incorporated herein by reference.

TECHNICAL FIELD

This disclosure relates to cooling systems for use in tools that shape materials and methods of making and using such cooling systems and tools.

BACKGROUND

Heat related defects are an ongoing problem in the shaping of heated materials and in casting processes in particular. Increased complexity of cast parts, demands for higher productivity, and demands for lower scrap rates all tend to place higher thermal loads on die cooling systems. Typical cooling systems usually consist of a number of channels drilled or cut into the tool through which a liquid coolant is intended to flow. This is a single-phase system, where heat is transferred from the die surface (which is in contact with the material being shaped), through the material of the die, and to the surface of the cooling channels, where the liquid cooling fluid absorbs heat and carries it away from the die.

Heat is removed from the cooling channel walls by the cooling fluid by forced convection in an attempt to maintain an isothermal condition at the shaping surface. However, due to the high heat flux at the interface between the heated material and the die, high heat diffusion resistance of the die material (e.g., tool steel), and the convective resistance of the cooling fluid, more heat is sometimes transferred into the die material than is removed by the cooling fluid during shaping and cooling portions of the process. This leads to an increase in the overall temperature of the die, which can cause of a number of heat related problems, such as die soldering, shrink porosity, and/or surface cracks in the shaped part. With conventional cooling systems, excess heat is sometimes removed using die spray after the solidification portion of the casting process. This can lengthen cycle times, increase lubricant use, increase liquid reclaim cost, and reduce die tool life via failure of the tool steel.

SUMMARY

In accordance with one embodiment, a tool for shaping a heated material includes a tool portion and a cooling passage formed in the tool portion. The tool portion includes a shaping surface that has a three-dimensional contour and contacts the heated material during shaping. The cooling passage is spaced from the shaping surface and includes a two-phase portion that is shaped to follow the three-dimensional contour of the shaping surface. The two-phase portion of the cooling passage is configured such that a cooling fluid flowing along the cooling passage undergoes two-phase fluid flow when extracting heat from the heated material.

In accordance with another embodiment, a tool for shaping a heated material includes a tool portion and a cooling passage formed in the tool portion. The tool portion includes a plurality of separately formed pieces with passage surfaces and a shaping surface that contacts the heated material during shaping. The cooling passage is spaced from the shaping surface, and opposing walls of the cooling passage are provided by the passage surfaces of the separately formed pieces. The opposing walls are spaced apart such that a cooling fluid flowing along a two-phase portion of the cooling passage undergoes two-phase fluid flow when extracting heat from the heated material.

In accordance with another embodiment, a method of shaping a heated material into a shaped article comprises the steps of: (a) introducing the heated material into a shaping tool; (b) contacting the heated material with a shaping surface of the shaping tool such that the heated material conforms to the shaping surface; and (c) extracting heat from the heated material while the shaping tool is in a closed condition via latent heat cooling. The extracted heat transforms liquid cooling fluid flowing along a cooling passage of the shaping tool to the vapor phase.

DRAWINGS

Preferred exemplary embodiments will hereinafter be described in conjunction with the appended drawings, wherein like designations denote like elements, and wherein.

DETAILED DESCRIPTION

Described below is a tool that shapes and cools heated material to form a manufactured article. The tool includes a cooling system with one or more cooling passages formed in the tool. A cooling fluid flows along the cooling passages while the heated material is in contact with a shaping surface of the tool and extracts heat from the heated material to help transform the material into the desired shape and/or state. The cooling passages can be configured as described below to greatly enhance the rate of heat extraction from the heated material by bringing the cooling fluid to its boiling point and employing the latent heat of evaporation of the cooling fluid to cool the heated material.

Figure 1:
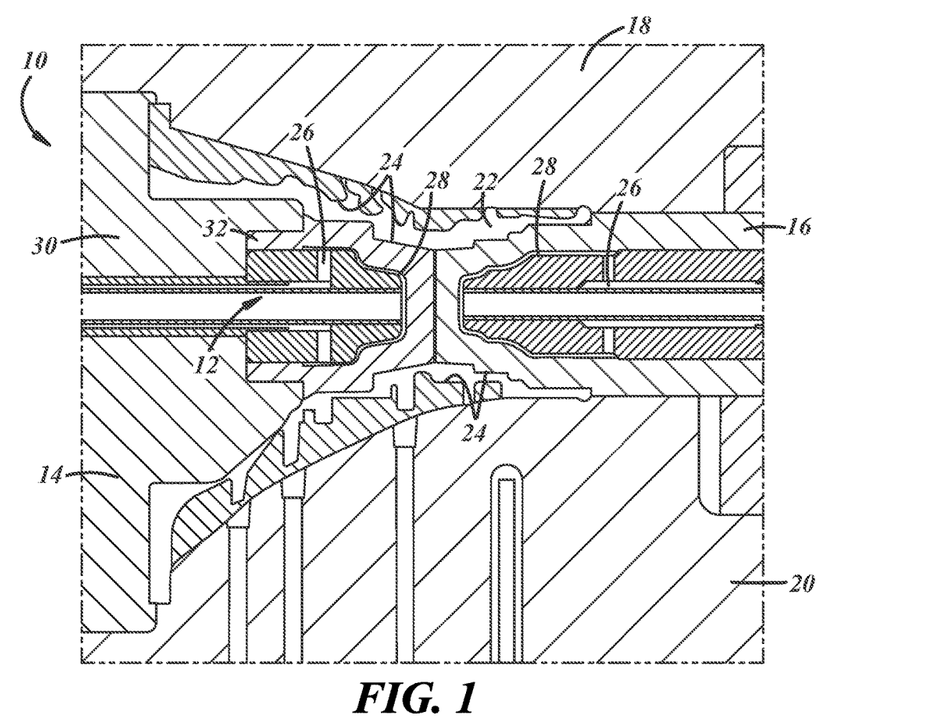
FIG. 1 is a cross-sectional view of an embodiment of a shaping tool in the form of a casting die that includes an enhanced cooling system with two-phase cooling passages.
Figure 2:
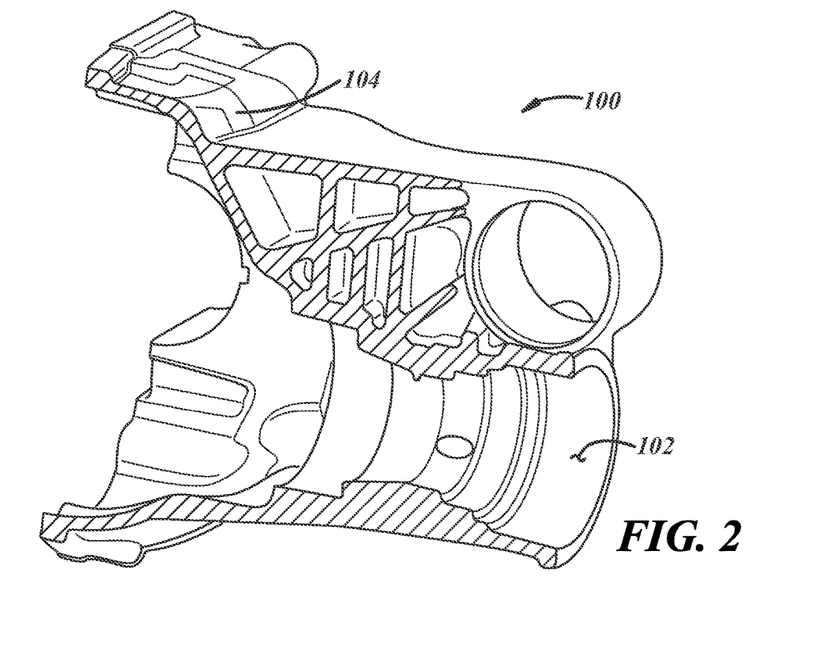
FIG. 2 is a cross-sectional perspective view of a molded article produced by the tool of FIG. 1.

Referring now to FIG. 1, there is shown an exemplary shaping tool 10 in the form of a casting die. The casting die 10 includes a cooling system 12 and is configured to shape molten material into a cast or molded article, such as the housing 100 illustrated in FIG. 2. In one particular embodiment, the tool 10 is adapted for use in a high pressure aluminum die casting process. The tool may be another type of molding tool, such as a low pressure metal casting die or a plastics injection molding tool. The tool may alternatively be a sheet forming tool, such as a hot metal stamping tool or a plastics thermoforming tool. These and other tools that can employ the cooling system 12 are collectively referred to herein as shaping tools.

The illustrated tool 10 includes a plurality of tool portions 14-20 and is shown in a closed condition in FIG. 1. When in the closed condition, the tool portions 14-20 together define a mold cavity 22. Each tool portion 14-20 has a shaping surface 24 exposed to the cavity 22. The heated material, which is molten metal in this particular example, is introduced into the cavity 22 and contacts and conforms to the shaping surfaces 24. The molten material is cooled with the help of the cooling system 12 and solidified in the cavity 22. The tool 10 can then be changed to an open condition to remove the article 100. In this example, tool portions 14, 16 are core portions with respective shaping surfaces 24 that define the shape of an interior surface 102 of the molded article 100, and tool portions 18, 20 are cavity portions that define the shape of an exterior surface 104 of the molded article. The tool is configured so that the core portions 14, 16 can move toward or away from each other to place the tool in the respective closed or open condition. The cavity portions 18, 20 can also move toward or away from each other to close or open the tool 10.

The cooling system 12 includes one or more cooling passages 26 and may include or employ one or more of the following features in various combinations: microchannels, two-phase fluid flow, conformal or three-dimensional cooling channels, bidirectional fluid flow, latent heat cooling, cooling channels with non-uniform cross-sectional areas along their length, a flow regime with non-negligible surface tension effects, opposing walls provided by separately formed pieces of the tool, or spacing between opposing passage walls that is at least an order of magnitude less than the length and width of the passage. This list of features is non-exhaustive and some of these features are described in further detail below.

In the example of FIG. 1, each of the core portions 14, 16 include cooling passages 26 with portions 28 configured for enhanced cooling. The illustrated core portion 14 includes a base 30 and an insert 32. The insert 32 includes a cooling passage 26 with a portion 28 configured for enhanced cooling. In one embodiment, portion 28 of the cooling passage 26 is a two-phase portion of the cooling passage. The cooling fluid flowing along the two-phase portion 28 of the cooling passage 26 undergoes two-phase fluid flow when extracting heat from the heated material in the cavity 22. In two-phase fluid flow, a portion of the cooling fluid is in the liquid phase, and a portion of the cooling fluid is in the vapor phase.

Two-phase fluid flow is a characteristic of latent heat cooling. As used herein, latent heat cooling is a type of cooling process that uses the latent heat of evaporation of the cooling fluid to extract heat from the heated material to solidify or otherwise change the phase or state of the heated material while the material is in contact with the shaping surface 24 of the tool 10. The latent heat of evaporation is the heat energy per unit mass of cooling fluid required to change the cooling fluid from liquid to vapor phase. Latent heat cooling thus extracts heat from the heated material via phase change of the cooling fluid at a constant temperature—i.e., at the boiling point of the fluid—and does not merely rely on thermal energy transfer to a liquid phase cooling fluid that only raises the temperature of the cooling fluid in accordance with the specific heat of the cooling fluid. Under certain conditions, such as in sufficiently configured cooling channel portions, bidirectional fluid flow may occur, where cooling fluid in the liquid phase is flowing in one direction and at least some cooling fluid in the vapor phase is flowing in the opposite direction.

Figure 3:
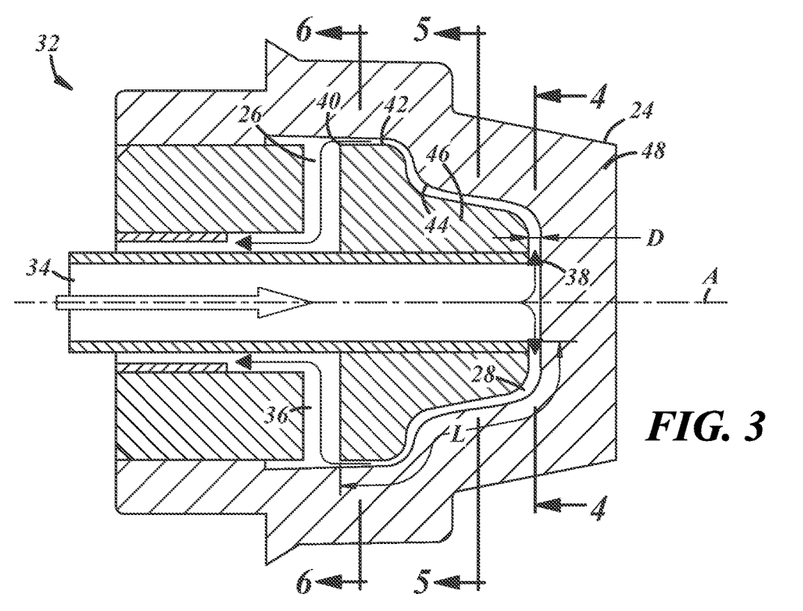
FIG. 3 is a cross-sectional view of a tool portion from the shaping tool of FIG. 1 illustrating flow of a cooling fluid through the cooling passage.

FIG. 3 is an enlarged cross-sectional view of the insert 32 of the core portion 14 of the tool of FIG. 1 and illustrates the flow of cooling fluid through the cooling passage 26, including along the two-phase portion 28 of the cooling passage. The illustrated cooling passage 26 includes a supply portion 34 and a return portion 36. The supply portion 34 is in fluidic communication with the two-phase portion 28 via a first opening 38 and with an external cooling fluid source (not shown). The return portion 36 is in fluidic communication with the two-phase portion 28 via a second opening 40 and with a cooling fluid return line (not shown). The two-phase portion 28 of the cooling passage 26 is located between the first and second openings 38, 40. As indicated by the arrows in FIG. 3, cooling fluid flows from the external cooling fluid source and into the insert 32 through the supply portion 34, enters the two-phase portion 28 of the passage 26 via the first opening 38, flows along the two-phase portion, and exits the two-phase portion via the second opening 40, flowing into the return portion 36 at away from the insert.

The cooling passage 26 is a hollow internal portion of the insert 32 and is spaced from the shaping surface 24. In the illustrated embodiment, the shaping surface 24 has a three-dimensional contour, and the two-phase portion 28 of the cooling passage 26 is shaped to follow this three-dimensional contour. The two-phase portion 28 of the illustrated passage 26 is defined between opposing walls or passage surfaces 42, 44. In this example, each of the passage surfaces 42, 44 is a three-dimensional surface that is shaped to follow the three-dimensional contour of the corresponding shaping surface 24 in the two-phase portion 28 of the passage 26.

Cooling passages that generally follow the contour of the shaping surface(s) of the tool may be referred to as conformal cooling passages. Conformal cooling passages may be configured to maintain a relatively constant thickness of tool material (e.g., tool steel) between the cooling passage and the shaping surface, changing direction along their length within the tool to follow the contour of the shaping surface.

As shown in FIG. 3, the insert 32 of tool portion 14 may be constructed from separately formed inner and outer pieces 46, 48 that are attached together to form the two-phase portion 28 of the passage therebetween. This construction enables the cooling passage 26 to include portions that follow the contours of the shaping surfaces and allows portions of the cooling passage to have variable dimensions along its length. Traditional cooling channels are drilled or cross-drilled into molding tools, typically resulting in a collection of linear, interconnected channels each with a circular cross-section that is dictated by the drill bit used to form it. While the two-phase and other portions of the cooling passage 26 may include round cross-sections and/or linear segments, the coolant passage described herein, and portions thereof, can be non-linear, three-dimensional and/or conformal. The opposing walls of the passage are not always the walls of a cylinder.

The passage walls 42, 44 oppose each other across the cooling passage 26 and are spaced from each other by a distance D, which may vary along the flow direction of the passage. The two-phase portion 28 of the cooling passage has a length L defined between the first and second openings 38, 40 and measured along the contour of the passage as shown. A width of the passage is measured in a direction transverse or perpendicular to both the lengthwise direction and the direction in which the distance D is measured. In the particularly illustrated embodiment, where the core insert 32 is round and symmetric about a central axis A, the passage width is measured in the circumferential direction. This is evident in FIGS. 4-6, which are cross-sectional views of the insert 32 taken at various planes along the central axis A.

Figure 4:
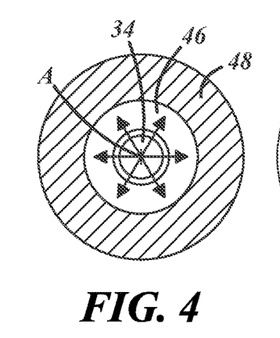
FIG. 4 is a cross-sectional view of the tool portion of FIG. 3 taken at a first opening where a supply portion of the cooling passage joins a two-phase portion of the cooling passage.
Figures 5, 6:
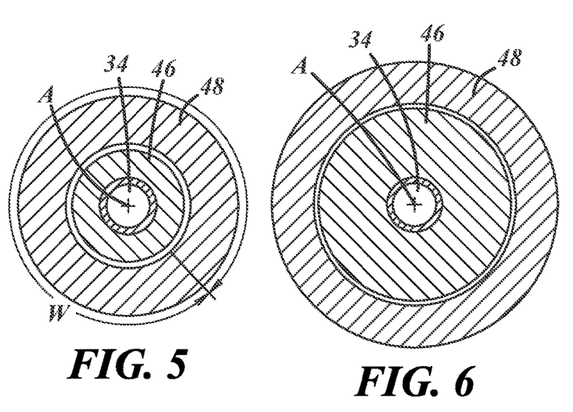
FIG. 5 is a cross-sectional view of the tool portion of FIG. 3 taken at the two-phase portion of the cooling passage.
FIG. 6 is a cross-sectional view of the tool portion of FIG. 3 taken at a different location along the length of the two-phase portion of the cooling passage.

The cross-section of FIG. 4 is taken at the first opening 38, where the supply portion 34 of the coolant passage joins the two-phase portion 28. Also depicted in FIG. 4 is the direction of cooling fluid flow at the first opening 38. The cooling fluid exiting the supply portion 34 of the cooling passage is dispersed radially through the annular first opening 38. The cross-section of FIG. 5 is taken through the two-phase portion 28 of the cooling passage. The cross-section of FIG. 6 is taken through the two-phase portion downstream from the cross-section of FIG. 6. The effective width W of the cooling passage in this example is the circumference at any given plane along the central axis. With the cooling passage shaped as in FIGS. 3-6, the effective width W of the two-phase portion 28 varies along the length of the passage. In particular, the width W increases along the length of the passage from the first opening 38 to the second opening 40. Also in this particular example, the distance D between the passage surfaces 42, 44 varies along the length of the passage, decreasing along the length of the passage from the first opening 38 to the second opening 40.

As is apparent from FIGS. 4-6, the cooling fluid flows along the two-phase portion 28 of the cooling passage in a sheet-like conformation with a relatively thin layer of cooling fluid extending in all directions along the three-dimensional contours of the passage surfaces 42, 44. In the illustrated example, the cooling fluid flows along the two-phase portion of the cooling passage in a thin, bell-shaped configuration, providing the cooling fluid over a very large surface area.

In various embodiments, the distance D between the opposing walls of the passage is at least one order of magnitude less than both the length L and the width W of the passage in the two-phase portion. In some embodiments, the distance D is at least two orders of magnitude less than both the length L and the width W. For instance, the distance D may be in a range from about 0.5 mm to about 4 mm, while the length L and the width W may both be in a range from 5 mm to 40 mm or from 50 mm to 400 mm. These ranges are non-limiting and are provided to highlight certain structural distinctions over traditional cooling channels.

As shown in the figures, the two-phase portion 28 may have smaller dimensions than other portions of the cooling passage 26 and, in some cases, smaller dimensions that traditional drilled cooling channels. In particular, the distance D between the opposing walls of the passage may be relatively small in the two-phase portion 28. These portions of the cooling passage may be referred to as microchannels, which is a non-limiting term with regard to passage size. Microchannels may be generally smaller in cross-section than traditional cooling channels provided in prior art tools for a given cooling fluid. For instance, traditional casting die cooling channels may be 9 mm to 10 mm in diameter with water-based cooling fluids, while comparable microchannels may range in size from about 0.5 mm to about 4 mm for a similar cooling fluid.

The two-phase portion 28 of the cooling passage may also be characterized by the fluid flow therein. The two-phase portion 28 can be sized or otherwise configured such that surface tension effects associated with vapor bubble formation in the cooling fluid play a relatively significant role in the fluid flow along the passage. In contrast to larger cooling channels, in which vapor bubbles are formed at and released from cooling channel walls, the two-phase portion of the cooling passage may be made sufficiently small that vapor bubbles quickly reach a size that spans the distance D between opposing passage walls, making surface tension effects appreciable as cooling fluid in the liquid phase makes its way through the bubble-filled passage. Other parameters useful for determining the characteristics a two-phase portion of the cooling passage are given below. Passage dimensions are also dependent on properties of the cooling fluid, and may thus be very different for water-based cooling fluids and oil-based cooling fluids, for example.

In some cases, the two-phase portion 28 of the cooling passage has a distance D between opposing wall that is sufficiently small that the pressure drop along the length of the passage must be accounted for in order to maintain cooling fluid flow in the desired flow regime. Thus, as noted above, the two-phase portion 28 may have a non-uniform cross-sectional area, or distance D between opposing walls, along its length to maintain the desired fluid velocity and flow rate along the passage.

Certain dimensionless quantities associated with fluid flow and surface tension effects can be combined and used to help achieve the desired two-phase fluid flow regime in the cooling passage. The Bond number (Bo) and the Reynolds number (Re) are two of these quantities. In some embodiments, the two-phase portion of the cooling passage is configured such that the following relationship is satisfied:

$Bo^{0.5} Re \leq 160$.

The Bond number is defined as:

$$Bo = \left[\frac{g(\rho_f - \rho_g)}{\sigma}\right] D^2,$$

where g is gravitational acceleration, $\rho_f$ is fluid density, $\rho_g$ is gas density, $\sigma$ is surface tension, and D is the depth of the passage (i.e., distance between opposing passage walls).

The Reynolds number is defined as:

$$Re = \frac{m'L}{\mu_f}$$

where m' is the mass flow rate, and $\mu_f$ is dynamic fluid viscosity. Further explanation of the significance of the interaction between the Bond number and the Reynolds number is described below.

Figure 7:
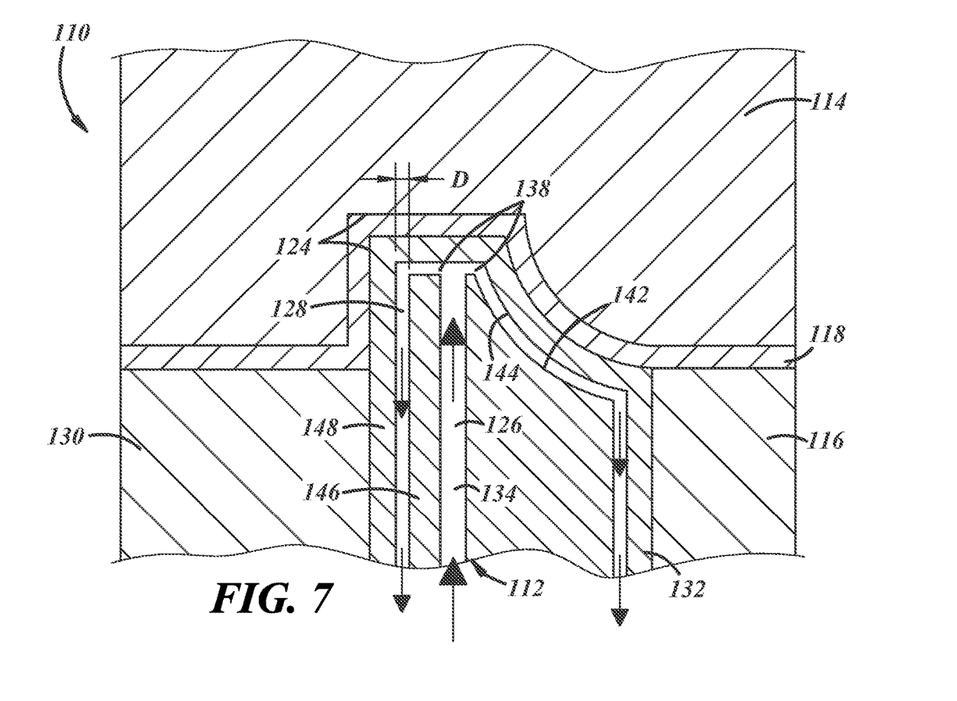
FIG. 7 is another embodiment of the shaping tool in the form of a sheet forming tool that includes the enhanced cooling system.

FIG. 7 is a cross-sectional view of another shaping tool 110 that employs the above-described enhanced cooling system. The illustrated shaping tool 110 is a sheet forming tool, such as a plastics thermoforming tool or a sheet metal stamping or forming tool. The cooling system may be particularly useful with a forming tool used in a hot stamping process, as such a process introduces heated material to the forming tool from which the heat must be removed after the formed article is made. The cooling system 112 is generally the same as that described above in connection with FIGS. 1-6, and the sheet metal forming tool 110 includes components analogous to the aforementioned casting die 10.

The tool of FIG. 7 includes first and second (i.e., upper and lower) tool portions 114, 116 and is shown in the closed condition with the heated material 118 being formed between the tool portions. Each tool portion has a shaping surface 124 that contacts the heated material and to which the heated material conforms. The heated material 118 is cooled with the help of the cooling system 112 before the tool is opened to remove the shaped article. The tool is configured so that the tool portions 114, 116 can move toward or away from each other to place the tool in the respective closed or open condition.

In the illustrated example, the lower tool portion 116 includes a base 130 and an insert 132. The insert 132 includes a cooling passage 126 with a portion 128 configured for enhanced cooling. The portion 128 may be a two-phase portion of the cooling passage. FIG. 7 illustrates the flow of cooling fluid through the cooling passage 126, including along the two-phase portion 128 of the cooling passage. The illustrated part of the cooling passage 126 includes a supply portion 134 in fluidic communication with the two-phase portion 128 via a first opening 138 and with an external cooling fluid source (not shown). As indicated by the arrows in FIG. 7, cooling fluid flows from the external cooling fluid source and into the insert 132 through the supply portion 134, enters the two-phase portion 128 of the passage 126 via the first opening 138, flows along the two-phase portion, and then exits the two-phase portion via a second opening (not shown).

As with the example of FIGS. 1-6, the shaping surface 124 has a three-dimensional contour, and the two-phase portion 128 of the cooling passage 126 is shaped to follow this three-dimensional contour. The two-phase portion 128 of the illustrated passage 126 is defined between opposing walls or passage surfaces 142, 144. In this example, at least a portion of the passage surfaces 142, 144 is a three-dimensional surface that is shaped to follow the three-dimensional contour of the corresponding shaping surface 124. The insert 132 is constructed from separately formed inner and outer pieces 146, 148 that are attached together to form the two-phase portion 128 of the passage therebetween. The passage walls 142, 144 oppose each other across the cooling passage 126 and are spaced from each other by a distance D, which may vary along the flow direction of the passage. As is apparent from FIG. 7, the cooling fluid flows along the two-phase portion 128 of the cooling passage in a sheet-like conformation with a relatively thin layer of cooling fluid extending in all directions along the passage surfaces 42, 44.

As applied to a hot stamping process, the enhanced cooling system may be useful to quench the heated sheet metal and/or transform or control the microstructure of the metal. The process may include heating the material above a transition temperature, forming the material while heated, and quenching the material to achieve a particular microstructure. The rate of cooling in the quenching step can be critical to achieve the desired microstructure. Certain boron-based steel, for example, may be heated to a temperature near, at, or above an austenitic transition temperature for forming, then quenched at a rate sufficient to form a martensite microstructure. If the cooling rate during quenching is too slow, the desired mechanical properties may not be achieved in the finished article.

In one particular example, the heated material is sheet steel heated to a temperature in a range from 650° C. to 850° C., or to some other suitable temperature at which the sheet material has enhanced formability thereby allowing complex shapes to be formed in a single stroke. The heated material is pressed between the tool portions, where it is cooled under pressure for a specific amount of time with the help of the above-described cooling system 112. The time required for cooling may vary based on the sheet thickness after full draw depth is reached. During the cooling period, the formed part is quenched in the closed tool at a cooling rate of at least 50° C./s or at a cooling rate in a range from about 50° C./s to 100° C./s, resulting in at least some martensitic transformation in the material. The total cycle time for transferring, stamping, and cooling may range from 15 to 25 seconds. The formed article exits the hot stamping tool at approximately 150° C. The above-described enhanced cooling system, with two-phase cooling passages and water as the cooling fluid, has been determined to increase the heat transfer coefficient from the heated material and through the shaping surface to the cooling passage to 1,000,000 W/m²K, compared with approximately 90,000 W/m²K with traditional cooling lines.

Experimental

The remaining figures and description summarize some of the principles of enhanced cooling system design, along with a description of the design and successful implementation of an illustrative enhanced cooling system in a steel casting die used in an aluminum die casting process. Skilled artisans will recognize specific examples of additional features of the cooling system and methods of using the cooling system in this non-limiting example. It is intended that such features may also be combined in various ways with the above-described features to realize the benefits of these teachings.

Successful prevention of high temperature concentration during a metal casting process has been achieved by design and implementation of the above-described enhanced (i.e., high-performance) cooling system. The cooling system employed two-phase fluid flow along a portion of a cooling passage of a die casting tool and achieved higher heat dissipation rates that simple liquid phase cooling. The two-phase fluid flow takes advantage of the latent heat of vaporization of the cooling fluid to provide relatively high heat transfer rates. As described below, the high-performance cooling system has been modeled with commercial software (e.g., FLOW3D®). A working example of the cooling system was implemented in a production casting die and the results correlated with numerical analysis.

The efficiency of a cooling system can typically be improved by: decreasing the thermal resistance of the die by moving the cooling channels or lines closer to the casting surface or by using a casting die material with a higher heat transfer coefficient; increasing the convective heat transfer coefficient between the cooling channel walls and the cooling fluid; and/or decreasing the temperature of the cooling fluid.

In some heated material shaping processes, such as high pressure aluminum casting, high pressure and high molten metal velocity compound the problem of excess heat during the casting process. Mechanical and thermal stresses are factors that can limit the minimum distance required between cooling channel and the casting surface of the die, for example.

Heat flux in a single-phase system (where liquid coolant is kept below its boiling point in the liquid phase) can be expressed as:

$$q_{s-p} = \dot{m} C_p (T_f - T_W) \quad (1)$$

where, $\dot{m}$, $C_p$, $T_f$, and $T_W$ are mass flow rate, specific heat, temperature of the cooling fluid, and temperature of the cooling passage wall, respectively. Changing the temperature of the cooling fluid has a limited effect on the efficiency of the cooling system.

Heat flux in a two-phase system, where the cooling fluid is kept at or above its boiling point as a mixture of liquid and vapor phases, can be expressed as:

$$q_{m-p} = \dot{m} \times h_{lg} \quad (2)$$

where, x and $h_{lg}$ are quality and latent heat of vaporization, respectively.

Figure 8:
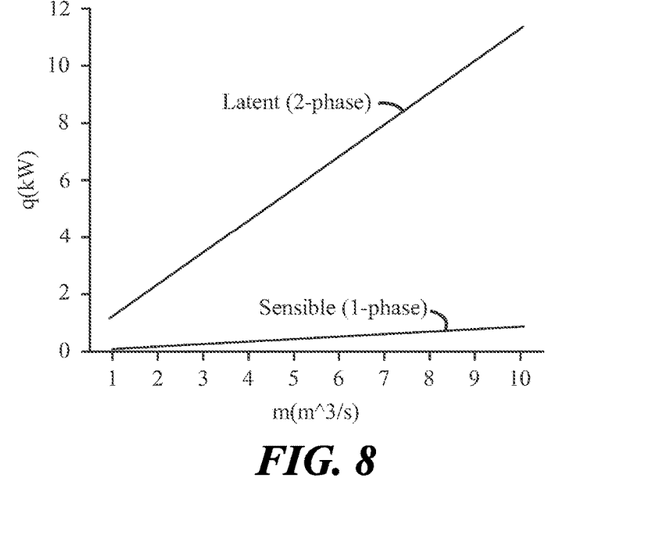
FIG. 8 is a plot illustrating the rate of heat dissipation by a cooling fluid undergoing single-phase fluid flow and two-phase fluid flow.

FIG. 8 is a plot of equations (1) and (2) indicating that the two-phase system can dissipate almost an order of magnitude more heat than the single-phase system. The higher efficiency of the two-phase system is due at least in part to the latent heat of evaporation of most fluids being at least an order of magnitude larger than the sensible heat, such that substantially more heat can be transferred at the same cooling fluid flow rate. Another advantage of the two-phase system is that evaporation of the cooling fluid always happens at the same boiling temperature, which can help prevent overcooling of the system.

Figure 9:
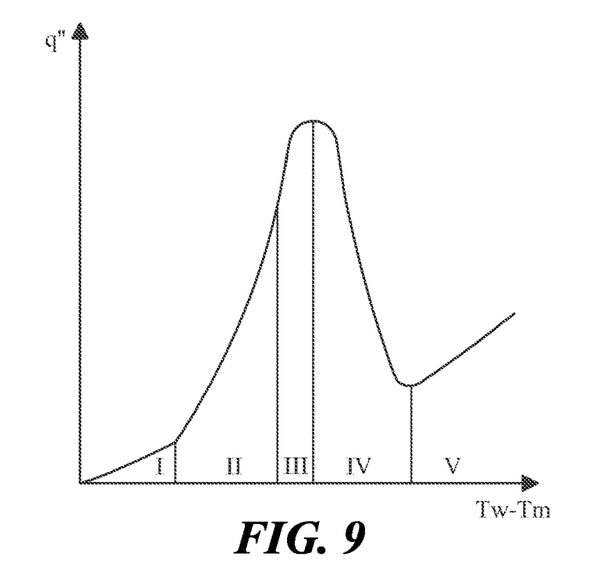
FIG. 9 is an example of a boiling curve for a cooling fluid.
Figure 10:
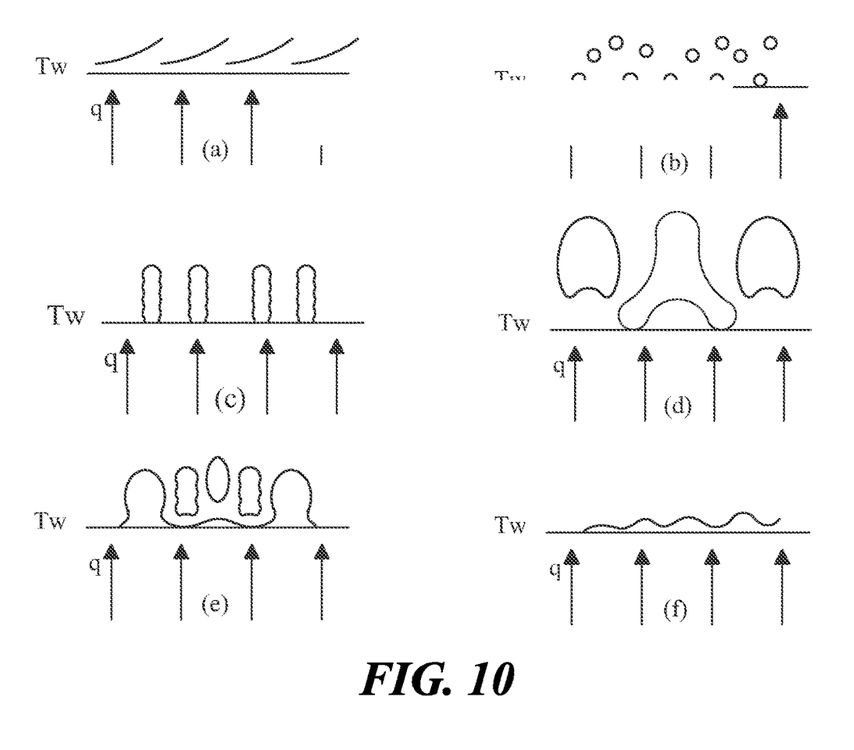
FIG. 10 schematically depicts vapor bubble formation in the cooling fluid at the various zones I-V of FIG. 9.

Boiling is a phase change process that occurs when a fluid reaches its saturation temperature and is a relatively effective mode of heat transfer. Various stages of boiling are depicted in FIGS. 9 and 10. A typical boiling curve is shown in FIG. 9 with schematic representations of vapor phase configurations in FIG. 10. Boiling starts in the layer adjacent to a superheated passage wall with the formation of isolated vapor (e.g., steam) bubbles. At this first stage (Zone I), bubble growth is suppressed by surface tension and Marangoni heat flow is the dominant heat transfer mechanism (FIG. 10(a)). As the wall temperature increases, the bubbles continue to grow and, at some point, overcome the surface tension suppression and separate from the wall (FIG. 10(b)). This formation and separation of vapor bubbles from the passage wall has a significant effect on the thermal boundary layer of the fluid. This stage of heat transfer corresponds to Zone II in FIG. 9.

As shown in FIG. 9, the change from convective heat transfer (I) to nucleate boiling (II) corresponds to a substantial increase in the heat transfer coefficient. As the wall temperature increases further, the formed bubbles begin to merge together as they move in the vertical direction, forming vapor or steam jets (FIG. 10(c)). This stage of boiling corresponds to Zone III in FIG. 9. At this stage, neighboring vapor jets merge into larger formations (FIG. 10(d)), and most of the surface of the heated wall is covered with vapor. The surface of the wall becomes isolated from the liquid making it difficult for the fluid to wet the surface of the heated wall. By the end of this, stage critical heat flux (CHF) is reached and wall temperature rises very quickly.

When the surface of the wall becomes isolated, heat cannot be transferred efficiently into the liquid cooling fluid. This causes the reduction of the heat flux as shown in Zone IV of FIG. 9. If the temperature of the wall continues to rise, the heat flux exceeds the CHF and the bulk of the fluid starts to boil (FIG. 10(e)). This signifies departure from nucleate boiling and is characterized by large bubble formation. This stage of boiling (IV) may be referred to as transition boiling or partial film boiling. Due to the dynamic nature of the process, conditions might oscillate between film and nucleate boiling. As the wall temperature continues to increase, the boiling process is transferred into film boiling, represented as Zone V in FIG. 9 and in FIG. 10(f).

An advantage of the two-phase cooling system is the ability to maintain a quasi-stable channel wall temperature in the direction of fluid flow in combination with a high heat transfer coefficient. Two-phase flow can occur in the cooling passages of the die during the cooling or solidification portion of the shaping process any time the cooling fluid reaches its boiling point. However, there are certain differences between the controlled two-phase flow in specially configured coolant passage portions and boiling cooling fluid in conventional die cooling channels. In the enhanced cooling system described herein, a portion of the cooling passage may be configured such that surface tension forces have a more pronounced influence on the fluid flow characteristics. Bubbly flow can be rarely observed in a microchannel because bubbles grow and quickly reach size of the passage. In a relatively small sized passage, Taylor instability is not typically present.

Figure 11:
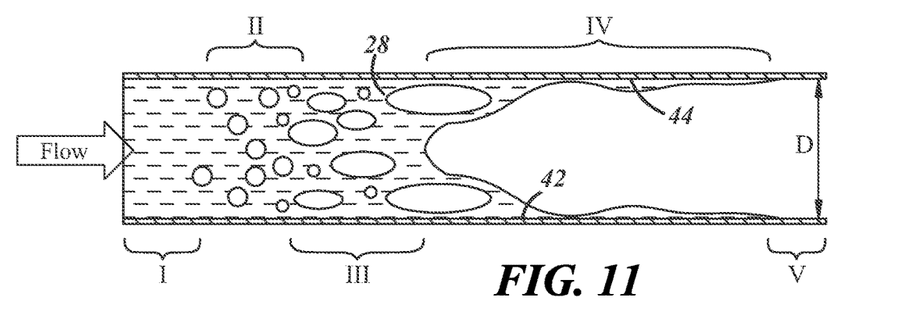
FIG. 11 depicts boiling and vapor bubble formation of the cooling fluid in the two-phase portion of the cooling passage.
Figure 12:
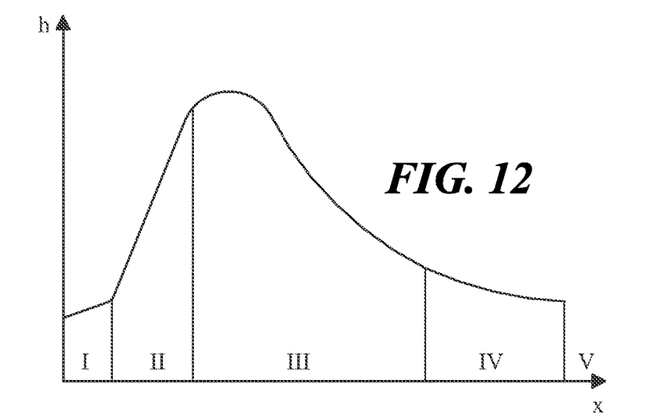
FIG. 12 is a plot of the heat transfer coefficient along the length of the two-phase portion of the cooling passage of FIG. 11.

Typical stages of the boiling process in microchannels are shown in FIG. 11. Stage I indicates single-phase (liquid) flow of the cooling fluid. Forced convection is the dominant heat transfer mode in Stage I. Stage II is characterized by a bubbly flow—a short and unstable flow regime. As more heat is transferred into the cooling fluid, the vapor bubbles grow larger, coalesce into larger slugs (Stage III), and occupy most or all of the distance D between the opposing passage walls. Further expansion of the bubbles reduces pressure in the fluid and surface tension force pushes the fluid front in the opposite direction. This causes a reverse flow, with a film of liquid cooling fluid adjacent to the passage walls (Stage IV). As the liquid continues to flow along the length of the passage, a thin layer of the fluid continues to evaporate, and can cause a dry-out condition if there is no sufficient fluid supply in the channel (Stage V). The heat transfer coefficient along the length of the two-phase passage is plotted in FIG. 12. As shown, the highest value for the heat transfer coefficient is reached near the end of the Stage II.

Cooling passages of a casting die or other shaping tool play an important role in extracting the heat transferred into the bulk tool material from the heated material (e.g., molten metal) during the cooling stage of the process. Increased capacity of the cooling passages can help reduce or prevent a number of the casting problems listed above. The ability to dissipate a larger heat flux can also reduce the cooling time of the heated material. Attempts have been made to optimize die cooling channels by providing specific channel shapes or sizes based on calculated thermal load—i.e., predicted hotter regions of the tool surface had an associated higher coolant flow rate, for example. However, in these efforts, cooling channel position and spacing were kept in line with conventional drilled cooling channel design.

Figure 13:
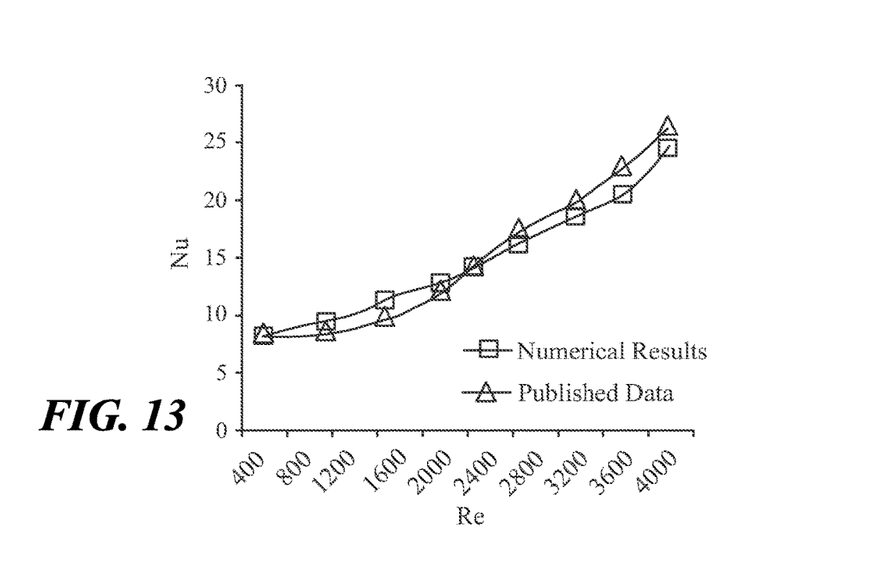
FIG. 13 is a comparison of numerical modeling to published data for fluid flow in a 0.2 mm passage.

The high-efficiency cooling system described herein, which may employ three-dimensional cooling passages and/or microchannels, has been modeled with commercial CFD software (e.g., FLOW3D®) in proof-of-concept experiments. A comparison of the results between experimentally derived (published) and numerically approximated relations between dimensionless Nu and Re numbers for water flowing in D=0.2 mm passage is illustrated in FIG. 13. Numerical results and experimental findings are within 5% of each other.

Figure 14:
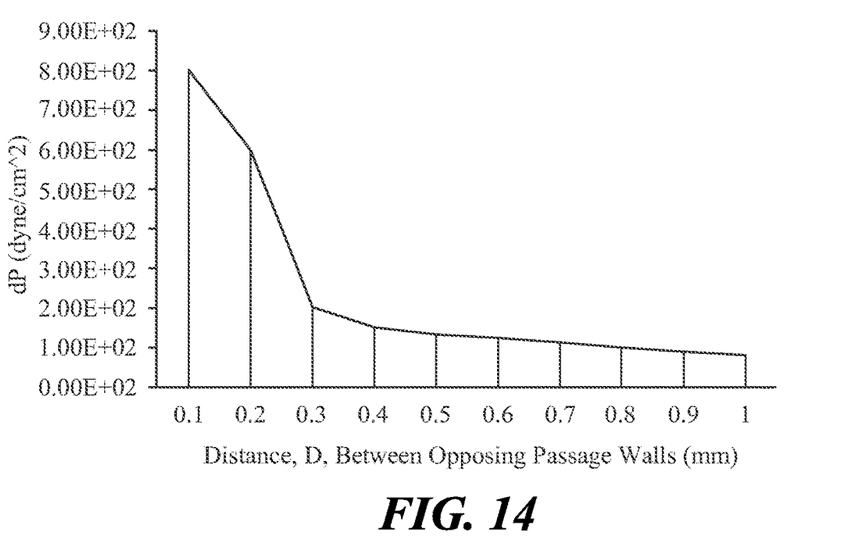
FIG. 14 is a plot of the pressure drop in a cooling passage as a function of the distance between opposing passage walls.
Figure 15:
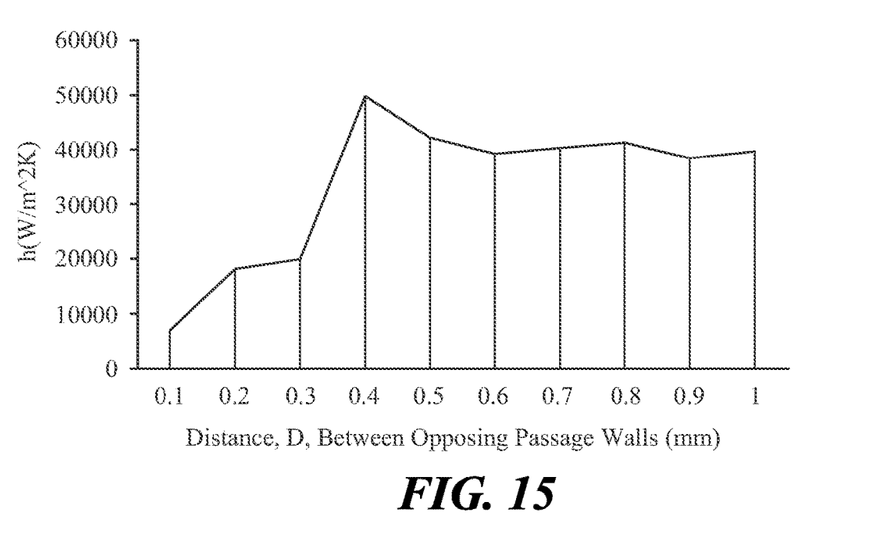
FIG. 15 is a plot of the heat transfer coefficient in a cooling passage as a function of the distance between opposing passage walls.

When employing a relatively small distance D between opposing passage walls, the pressure drop along the length L of the passage should be considered when designing the cooling system. Pressure variation in a cooling passage is plotted in FIG. 14 as a function of distance D between opposing passage walls. In the illustrated example, the pressure drop is substantially reduced for a passage dimension D of 0.4 mm or larger. The effect of the distance D between opposing passage walls on the heat transfer coefficient is plotted in FIG. 15. In this example, the heat transfer coefficient is substantially independent of the distance D for values of 0.4 mm or larger.

In some cases, unconfined bubble flow is the preferred flow regime in order to maximize the heat transfer coefficient in the cooling passage. The transition between confined and unconfined bubble flow in a microchannel is expressed as follows:

$$Bo^{0.5}Re=160. \quad (3)$$

where, Bo is the Bond number and Re is the Reynolds number. The transition between Zones IV and V of FIG. 11 is represented by equation (3), with numbers greater than 160 indicating Zone V flow and numbers less than 160 indicating Zone IV flow.

A metal die casting tool with a core portion in front of the gate was chosen to verify the effectiveness of the enhanced cooling system. The embodiments depicted in FIGS. 1-6 are representative of the verification tool. This casting tool is used in a high pressure die casting process to produce a part from aluminum A380. The weight of the cast article is 4.1 kg with a 6 mm average wall thickness. The velocity of molten material velocity at the gate during the casting process is 40 m/s. The conventional core was cooled by a cascade-type water bubbler. The conventional core had an on-going problem with soldering and had a dedicated outside spray cooling line to further cool the core after each cycle. The particular core portion discussed here is the insert 32 of FIGS. 1 and 3, which includes a shaping surface that forms a portion of the interior surface of the cast article of FIG. 2.

The cooling passage 26 depicted in FIGS. 1 and 3, including the two-phase portion 28, was implemented as a two-piece insert 32 made from H13 tool steel. The two-phase portion 28 of the cooling passage 26 is formed between the separately formed inner and outer pieces 46, 48, which are welded or otherwise attached together. In order to minimize diffusion resistance of the outer piece 48, which includes the shaping surface 24 that comes into contact with the molten casting material during the casting process, the cooling passage is positioned as close to the shaping surface as possible, accounting for the pressure of the high velocity molten metal during the die filling portion of the process. An FEA analysis was performed to verify that the stresses generated in the core portion from the interaction with the molten metal during the die cast operation do not exceed fatigue stress of the H13 steel.

Figure 16:
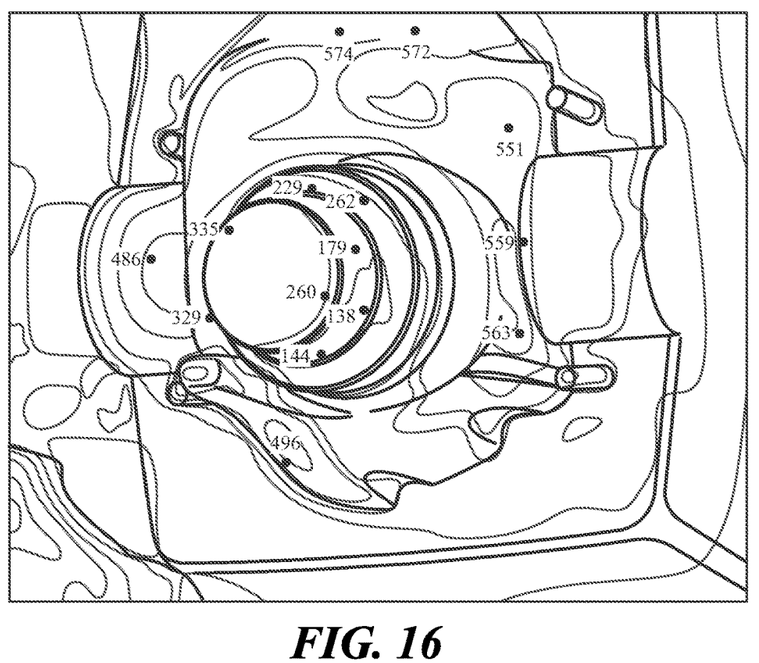
FIG. 16 is a converted thermal image of the core portion of the tool of FIG. 1 with the enhanced cooling system.
Figure 17:
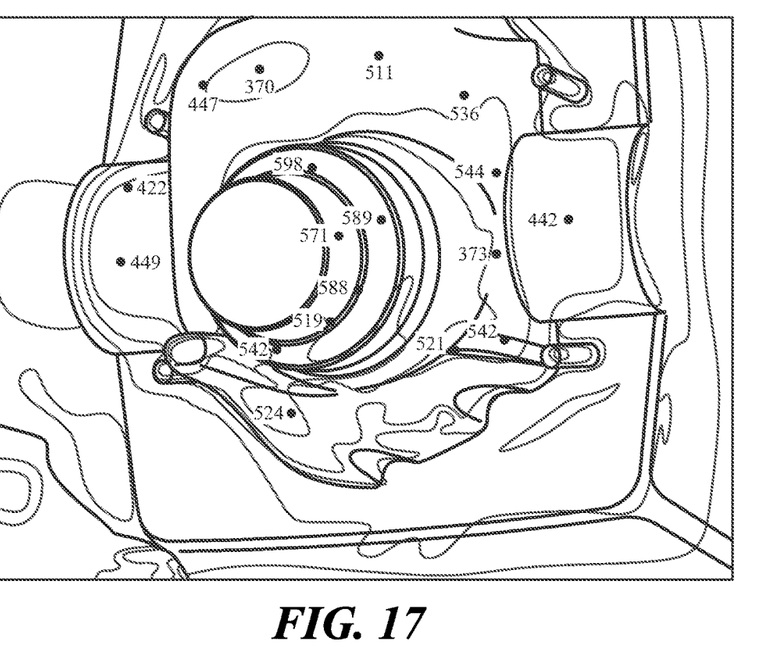
FIG. 17 is a converted thermal image of the same core portion before implementation of the enhanced cooling system.

After verifying by simulation that the stresses would not exceed the fatigue stress of the tool steel, the insert 32 was fabricated and implemented in the core portion 14 of the casting die 10 of FIG. 1. After 2000 casting cycles, the temperature of the core portion was measured using an FLIR infrared thermal imaging camera, with the results shown in FIG. 16. The temperatures of various portions of the core portion with the enhanced cooling system were compared with those of the original core that used conventional cooling (FIG. 17). The temperatures were measured before the auxiliary cooling spray that was previously implemented with the original and conventional cooling system. As can be observed in FIG. 16, the core with the enhanced cooling system, including two-phase cooling passages, likely does not require any auxiliary post-cycle cooling, such as a coolant spray after part solidification. The core insert with the enhanced cooling system was visually inspected after 6000 casting cycles and did not exhibit any evidence of soldering.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of shaping a heated material into a shaped article, comprising the steps of:
   (a) introducing the heated material into a shaping tool;
   (b) contacting the heated material with a shaping surface of the shaping tool such that the heated material conforms to the shaping surface; and
   (c) extracting heat from the heated material while the shaping tool is in a closed condition via latent heat cooling, wherein the extracted heat transforms cooling fluid flowing along a cooling passage of the shaping tool from a liquid phase to a vapor phase;
   wherein the cooling fluid in the liquid phase flows from a supply passage formed in the shaping tool;
   wherein the cooling passage receives the cooling fluid in the liquid phase from the supply passage and directs the cooling fluid into a two-phase portion of the cooling passage where at least a portion of the cooling fluid is transformed from the liquid phase to the vapor phase; wherein the two-phase portion of the cooling passage is at least partially defined by first and second passage surfaces; and wherein the two-phase portion of the cooling passage is located between first and second openings and the two-phase portion of the cooling passage has a distance (D) defined between the first and second passage surfaces, wherein the distance (D) is greater at the first opening than at the second opening such that the cooling fluid flowing along the two-phase portion of the cooling passage undergoes two-phase fluid flow as the heat is extracted from the heated material.

2. The method of claim 1, wherein the shaping tool is a casting die and the heated material is molten metal introduced into a cavity of the shaping tool while the tool is in the closed condition, wherein step (c) includes extracting a sufficient amount of heat from the molten metal to solidify the molten metal into the shaped article.

3. The method of claim 1, wherein the shaping tool is a sheet metal forming die and the heated material is sheet metal heated above a transformation temperature and introduced into the tool while the tool is in an open condition, wherein step (c) includes quenching the heated sheet metal.

4. The method of claim 3, wherein the sheet metal comprises steel and step (c) includes inducing a martensitic transformation in the steel.

5. The method of claim 1, further comprising controlling the flow of cooling fluid along the cooling passage in a manner that achieves bidirectional fluid flow, wherein cooling fluid in the liquid phase flows in one direction along the cooling passage and cooling fluid in the vapor phase flows in the opposite direction along the cooling passage.

6. The method of claim 1, wherein the cooling passage spreads the cooling fluid in a plurality of directions into the two-phase portion of the cooling passage.

7. The method of claim 1, wherein the two-phase portion of the cooling passage is configured such that vapor bubbles formed in the cooling fluid substantially span the distance (D) along at least a portion of the two-phase portion of the cooling passage.

8. A method of shaping a heated material into a shaped article, comprising the steps of:
(a) introducing the heated material into a shaping tool;
(b) contacting the heated material with a shaping surface of the shaping tool such that the heated material conforms to the shaping surface; and
(c) extracting heat from the heated material while the shaping tool is in a closed condition via latent heat cooling, wherein the extracted heat transforms cooling fluid flowing along a cooling passage of the shaping tool from a liquid phase to a vapor phase;
wherein the cooling fluid in the liquid phase flows from a supply passage formed in the shaping tool;
wherein the cooling passage receives the cooling fluid in the liquid phase from the supply passage and directs the cooling fluid into a two-phase portion of the cooling passage where at least a portion of the cooling fluid is transformed from the liquid phase to the vapor phase; and
wherein the two-phase portion of the cooling passage is configured such that $Bo^{0.5}Re \leq 160$, where Bo is the Bond number and Re is the Reynolds number associated with the two-phase fluid flow.

9. The method of claim 8, wherein the two-phase portion of the cooling passage is at least partially defined by first and second passage surfaces.

10. A method of shaping a heated material into a shaped article, comprising the steps of:
(a) introducing the heated material into a shaping tool;
(b) contacting the heated material with a shaping surface of the shaping tool such that the heated material conforms to the shaping surface; and
(c) extracting heat from the heated material via latent heat cooling, wherein the extracted heat transforms cooling fluid flowing along a two-phase portion of a cooling passage of the shaping tool from a liquid phase to a vapor phase;
wherein the cooling passage receives the cooling fluid in the liquid phase from a supply passage and directs the cooling fluid into the two-phase portion of the cooling passage where at least a portion of the cooling fluid is transformed from the liquid phase to the vapor phase, the two-phase portion of the cooling passage at least partially defined by first and second passage surfaces, the first passage surface is part of a first tool portion and the second passage surface is part of a second tool portion; and
wherein the two-phase portion of the cooling passage is located between first and second openings and the two-phase portion of the cooling passage has a distance (D) defined between the first and second passage surfaces, wherein the distance (D) is greater at the first opening than at the second opening such that the cooling fluid flowing along the two-phase portion of the cooling passage undergoes two-phase fluid flow as the heat is extracted from the heated material.

11. The method of claim 10, wherein the shaping tool is a casting die and the heated material is molten metal introduced into a cavity of the shaping tool while the tool is in a closed condition, wherein step (c) includes extracting a sufficient amount of heat from the molten metal to solidify the molten metal into the shaped article.

12. The method of claim 10, wherein the shaping tool is a sheet metal forming die and the heated material is sheet metal heated above a transformation temperature and introduced into the tool while the tool is in an open condition, wherein step (c) includes quenching the heated sheet metal.

13. The method of claim 10, further comprising controlling the flow of cooling fluid along the cooling passage in a manner that achieves bidirectional fluid flow, wherein cooling fluid in the liquid phase flows in one direction along the cooling passage and cooling fluid in the vapor phase flows in the opposite direction along the cooling passage.

14. The method of claim 10, wherein the cooling passage spreads the cooling fluid in a plurality of directions into the two-phase portion of the cooling passage and
wherein the two-phase portion of the cooling passage is configured such that vapor bubbles formed in the cooling fluid substantially span the distance (D) between opposing walls of the cooling passage.

15. A method of shaping a heated material into a shaped article, comprising the steps of:
(a) introducing the heated material into a shaping tool;
(b) contacting the heated material with a shaping surface of the shaping tool such that the heated material conforms to the shaping surface; and
(c) extracting heat from the heated material via latent heat cooling, wherein the extracted heat transforms cooling fluid flowing along a two-phase portion of a cooling passage of the shaping tool from a liquid phase to a vapor phase, the two-phase portion of the cooling passage is defined at least in part by first and second passage surfaces, the first passage surface is part of a first tool portion and the second passage surface is part of a second tool portion;

wherein the cooling passage receives the cooling fluid in the liquid phase from a supply passage and directs the cooling fluid into the two-phase portion of the cooling passage where at least a portion of the cooling fluid is transformed from the liquid phase to the vapor phase; and wherein the two-phase portion of the cooling passage is configured such that $Bo^{0.5}Re \leq 160$, where Bo is the Bond number and Re is the Reynolds number associated with the two-phase fluid flow.

16. A method of shaping a heated material into a shaped article, comprising the steps of:
(a) introducing the heated material into a shaping tool;
(b) contacting the heated material with a shaping surface of the shaping tool such that the heated material conforms to the shaping surface; and
(c) extracting heat from the heated material via latent heat cooling, wherein the extracted heat transforms cooling fluid flowing along a cooling passage of the shaping tool from a liquid phase to a vapor phase and forms vapor bubbles in the cooling fluid that substantially span a distance (D) between opposing walls of the cooling passage;

wherein the cooling passage receives the cooling fluid in the liquid phase from a supply passage and directs the cooling fluid into a two-phase portion of the cooling passage where at least a portion of the cooling fluid is transformed from the liquid phase to the vapor phase; and wherein the two-phase portion of the cooling passage is located between first and second openings and the two-phase portion of the cooling passage has the distance (D) defined between first and second passage surfaces at least partially defining the two-phase portion of the cooling passage, wherein the distance (D) is greater at the first opening than at the second opening such that the cooling fluid flowing along the two-phase portion of the cooling passage undergoes two-phase fluid flow as the heat is extracted from the heated material.

17. The method of claim 16, wherein the shaping tool is a casting die and the heated material is molten metal introduced into a cavity of the shaping tool while the tool is in a closed condition, wherein step (c) includes extracting a sufficient amount of heat from the molten metal to solidify the molten metal into the shaped article.

18. The method of claim 16, wherein the shaping tool is a sheet metal forming die and the heated material is sheet metal heated above a transformation temperature and introduced into the tool while the tool is in an open condition, wherein step (c) includes quenching the heated sheet metal.

19. The method of claim 16, further comprising controlling the flow of cooling fluid along the cooling passage in a manner that achieves bidirectional fluid flow, wherein cooling fluid in the liquid phase flows in one direction along the cooling passage and cooling fluid in the vapor phase flows in the opposite direction along the cooling passage.

20. The method of claim 16, wherein the cooling passage spreads the cooling fluid in a plurality of directions into the two-phase portion of the cooling passage.

21. A method of shaping a heated material into a shaped article, comprising the steps of:
(a) introducing the heated material into a shaping tool;
(b) contacting the heated material with a shaping surface of the shaping tool such that the heated material conforms to the shaping surface; and
(c) extracting heat from the heated material via latent heat cooling, wherein the extracted heat transforms cooling fluid flowing along a cooling passage of the shaping tool from a liquid phase to a vapor phase and forms vapor bubbles in the cooling fluid that substantially span a distance (D) between opposing walls of the cooling passage;

wherein the cooling passage receives the cooling fluid in the liquid phase from a supply passage and directs the cooling fluid into a two-phase portion of the cooling passage where at least a portion of the cooling fluid is transformed from the liquid phase to the vapor phase; and wherein the two-phase portion of the cooling passage is configured such that $Bo^{0.5}Re \leq 160$, where Bo is the Bond number and Re is the Reynolds number associated with the two-phase fluid flow.

* * * * *

UNITED STATES PATENT AND TRADEMARK OFFICE
CERTIFICATE OF CORRECTION

| | | |
|---|---|---|
| PATENT NO. | : 10,286,448 B2 | Page 1 of 1 |
| APPLICATION NO. | : 16/023254 | |
| DATED | : May 14, 2019 | |
| INVENTOR(S) | : Alexandre Reikher | |

It is certified that error appears in the above-identified patent and that said Letters Patent is hereby corrected as shown below:

In the Specification

Column: 1, Line: 44 replace "...which can cause of a number..." with "...which can cause a number..."

Column: 4, Line: 52 replace "...return portion 36 at away from..." with "...return portion 36 away from..."

Column: 6, Line: 10 replace "...smaller dimensions that traditionally drilled..." with "...smaller dimensions than traditionally drilled..."

Column: 6, Line: 42 replace "...between opposing wall that is..." with "...between opposing walls that is..."

Column: 6, Line: 67 replace "...(i.e., distance between opposing passage walls." with "...(i.e., distance between opposing passage walls)."

Column: 8, Line: 63 replace "...dissipation rates that simple liquid..." with "...dissipation rates than simple liquid..."

Signed and Sealed this
Thirtieth Day of July, 2019

Andrei Iancu
*Director of the United States Patent and Trademark Office*